(12) United States Patent
Oka et al.

(10) Patent No.: US 9,277,524 B2
(45) Date of Patent: Mar. 1, 2016

(54) COOPERATIVE LOCALIZATION OF PORTABLE ELECTRONIC DEVICES

(75) Inventors: Anand Ravindra Oka, Waterloo (CA);
Robert George Oliver, Waterloo (CA);
Christopher Harris Snow, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 605 days.

(21) Appl. No.: 13/451,802

(22) Filed: Apr. 20, 2012

(65) Prior Publication Data

US 2013/0281120 A1    Oct. 24, 2013

(51) Int. Cl.
*H04W 24/00* (2009.01)
*H04W 64/00* (2009.01)
*G01S 5/02* (2010.01)
*G01S 5/14* (2006.01)
*H04W 84/18* (2009.01)

(52) U.S. Cl.
CPC .............. *H04W 64/00* (2013.01); *G01S 5/0257* (2013.01); *G01S 5/0284* (2013.01); *G01S 5/0289* (2013.01); *G01S 5/14* (2013.01); *H04W 84/18* (2013.01)

(58) Field of Classification Search
CPC ... H04W 64/00; H04W 48/04; H04W 76/007; H04W 36/32; H04W 4/02; H04W 4/14
USPC ............. 455/456.2, 456.1, 440, 456.4, 456.5, 455/456.6, 456.7, 404.1, 456.3, 466
See application file for complete search history.

(56) References Cited

U.S. PATENT DOCUMENTS

2003/0220116 A1* 11/2003 Sagefalk et al. ............ 455/456.1
2008/0248813 A1* 10/2008 Chatterjee .................. 455/456.2
2012/0329479 A1* 12/2012 Wirola et al. ............... 455/456.1

FOREIGN PATENT DOCUMENTS

EP     1788357 A1    5/2007

OTHER PUBLICATIONS

English Translation_EP 1788357 A1 (FR).*
Extended European Search Report dated Oct. 1, 2012 corresponding to European Patent Application No. 12164887.7.

(Continued)

*Primary Examiner* — Charles Appiah
*Assistant Examiner* — Alexander Yi
(74) *Attorney, Agent, or Firm* — Moffat & Co.

(57) ABSTRACT

A method, computing device and computer readable memory for cooperative localization of a portable electronic device is provided. Location identification messages are received each providing a known location of a respective portable electronic device and an associated transmitter identification (ID) of the respective portable electronic device and stored. Location request messages providing one or more transmitter IDs in communication range with a query portable electronic device and a transmitter ID of the query portable electronic device are received and location information from the stored location information associated with the one or more transmitter IDs received in the location request message is retrieved. A location of the query portable electronic device is estimated based on the retrieved location information and stored with the associated transmitter ID of the query portable electronic device.

25 Claims, 12 Drawing Sheets

(56) References Cited

OTHER PUBLICATIONS

European Patent Office, Office Action on Application No. 12164887.7, Issued on Aug. 17, 2015.

Guenther Retscher et al: "Integration of RFID, GNSS and DR for Ubiquitous Positioning in Pedestrian Navigation", Journal of Glocal Positioning Systems vol. 6, No. 1, Jan. 1, 2007, pp. 56-64, XP007919630, [retrieved on Jan. 1, 2007].

* cited by examiner

COOPERATIVE LOCALIZATION OF PORTABLE ELECTRONIC DEVICES

TECHNICAL FIELD

The current description relates to an apparatus, system and methods of determining a location of a portable electronic device, and in particular to determining a position of a portable electronic device using cooperative localization.

BACKGROUND

Location based services require a good knowledge of the geographical position of users, outdoors as well as indoors. A user's geographical position may be determined using a Global Positioning System (GPS), or more broadly Global Navigation Satellite System (GNSS), receiver of the user's portable electronic device. Outdoors, and in areas of good GPS signal reception, the location can typically be obtained, potentially with an accuracy of approximately 5 to 10 meters.

Positioning services are often unavailable indoors, or in areas of poor GNSS signal reception. In such cases the user has to be localized via other such as assisted GPS systems that use cellular or Wi-Fi radio signal strength indicator (RSSI) measurements to provide positioning information, Wi-Fi signature analysis or radio frequency beacon system. Although these additional techniques may be helpful to provide additional location information, they typically do not provide highly accurate estimate of the location and require defined configuration.

It is desirable to provide a location technique that can provide an estimate of a location of a portable electronic device us cooperative localization techniques.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
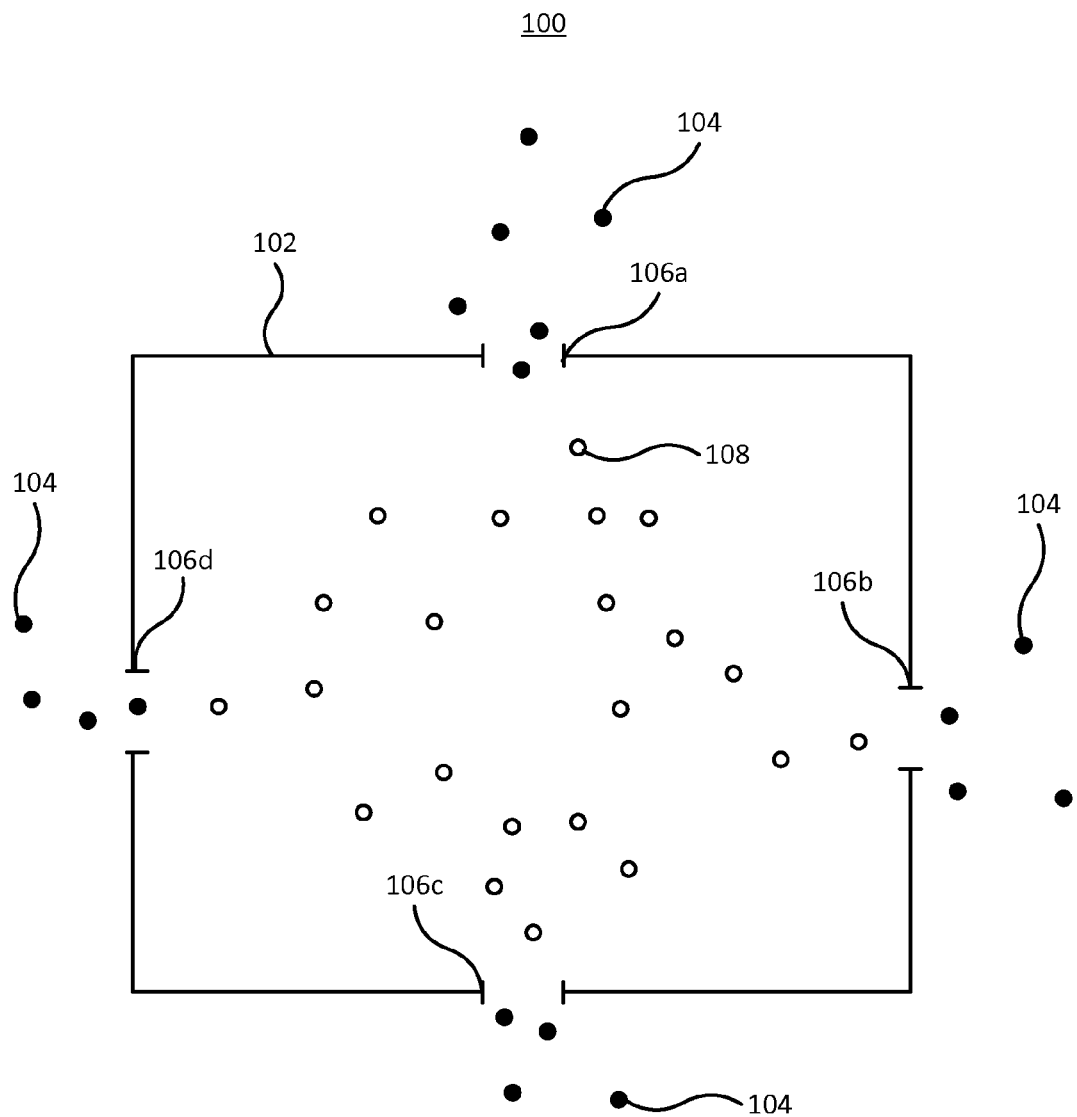
FIG. 1 depicts an illustrative environment in which the cooperative localization can be used.

In accordance with an aspect of the present disclosure there is provided a method of cooperative localization of a portable electronic device, the method comprising receiving at a server a plurality of location identification messages each providing a known location information of a respective portable electronic device and an associated transmitter identification (ID) of the respective portable electronic device; storing the received location information and associated transmitter IDs at the server; receiving at the server a location request message providing one or more transmitter IDs in communication range with a query portable electronic device and a transmitter ID of the query portable electronic device; retrieving location information from the stored location information associated with the one or more transmitter IDs received in the location request message; estimating a location of the query portable electronic device based on the retrieved location information; storing the estimated location of the query portable electronic device with the associated transmitter ID; and transmitting the estimated location to the query portable electronic device.

In accordance with another aspect of the present disclosure there is provided a computing device for estimating a location of a portable electronic device comprising: a processor for executing instructions; and a memory for storing instructions, the instructions when executed by the processor configuring the computing device to provide a method comprising: receiving at a server a plurality of location identification messages each providing a known location information of a respective portable electronic device and an associated transmitter identification (ID) of the respective portable electronic device; storing the received location information and associated transmitter IDs at the server; receiving at the server a location request message providing one or more transmitter IDs in communication range with a query portable electronic device and a transmitter ID of the query portable electronic device; retrieving location information from the stored location information associated with the one or more transmitter IDs received in the location request message; estimating a location of the query portable electronic device based on the retrieved location information; storing the estimated location of the query portable electronic device with the associated transmitter ID; and transmitting the estimated location to the query portable electronic device.

In accordance with yet another aspect of the present disclosure there is provided a computer readable memory containing instructions for cooperative localization of a portable electronic device, the instruction which when executed by a processor performing: receiving at a server a plurality of location identification messages each providing a known location information of a respective portable electronic device and an associated transmitter identification (ID) of the respective portable electronic device; storing the received location information and associated transmitter IDs at the server; receiving at the server a location request message providing one or more transmitter IDs in communication range with a query portable electronic device and a transmitter ID of the query portable electronic device; retrieving location information from the stored location information associated with the one or more transmitter IDs received in the location request message; estimating a location of the query portable electronic device based on the retrieved location information; storing the estimated location of the query portable electronic device with the associated transmitter ID; and transmitting the estimated location to the query portable electronic device.

Location based services require that the position of a user be known. The position of a user or device may be determined in various ways, such as through GPS or other means. Current location determination techniques typically do not work well indoors as they require the reception of GPS signals, or signals from wireless transmitters such as cell tower transmitters, which may not penetrate indoors well. As described further herein, it is possible to determine an estimate of a user's location based on received short-range communication radio signals transmitted from other portable electronic devices. The short-range communication radios are considered herein to be Bluetooth™ radios although other short-range communication radios are possible such as ZigBee™. The communications may utilize a peer-to-peer communication technologies or Wireless Personal Area Network (WPAN) standards. The location technique described further herein determines a location estimate for a portable electronic device based on locations associated with Bluetooth radios that are in communication range of the portable electronic device.

FIG. 1 depicts an illustrative environment in which the cooperative localization can be used. The environment 100 comprises an indoor location 102. The indoor location 102 may comprise a public space such as a shopping mall, museum, building, etc. The cooperative localization described herein can be used to provide a location of users, or more particularly the portable electronic devices' of the users, within the public space 102. The user locations determined using the cooperative localization technique described herein can be used for various purposes, such as providing directions from a user's current location to a desired location within the public space 102. The location estimate may be further used to provide additional information to the user based on the location estimate such as information pertaining to a display of the user's estimated location, a map, directions, or to push or provide information relevant to the users location for example a special offer associated with a product sold at the estimated location of the user.

As depicted in FIG. 1, a plurality of users 104 may be outside the indoor location 102. While outdoors, the users 104 may be able to receive a GPS signal and as such be able to determine the position of the user with a reasonably high degree of accuracy, represented graphically in Figure by the black circles. The users 104 may enter the indoor location 102 through one of a plurality of doors 106a, 106b, 106c, 106d. As depicted in FIG. 1, once inside the indoor location 102, the users no longer receive the GPS signal and as such cannot use GPS to determine their location as represented by the white circles 108. As described further below, the location of the indoor users' 108 can be determined based on the location of adjacent users, or users within short-range communication range such as Bluetooth. As a user enters the indoor space 102, the user's portable electronic device can utilize inertial navigation to 'pull' the GPS location into the indoor space 102. That is, the inertial navigation of the portable electronic device can be used to extend the GPS location into the indoor space 102, providing known location information inside the indoor space 102. As more users enter the indoor space 102, the portable electronic devices can continue to use inertial navigation to further extend the range of known locations further into the indoor space 102. As more users enter the indoor location 102 it is possible to extend the known locations to cover a substantial portion of the indoor space 102 and provide a bubble of location information which improves as devices move in to the indoor space.

Figure 2:
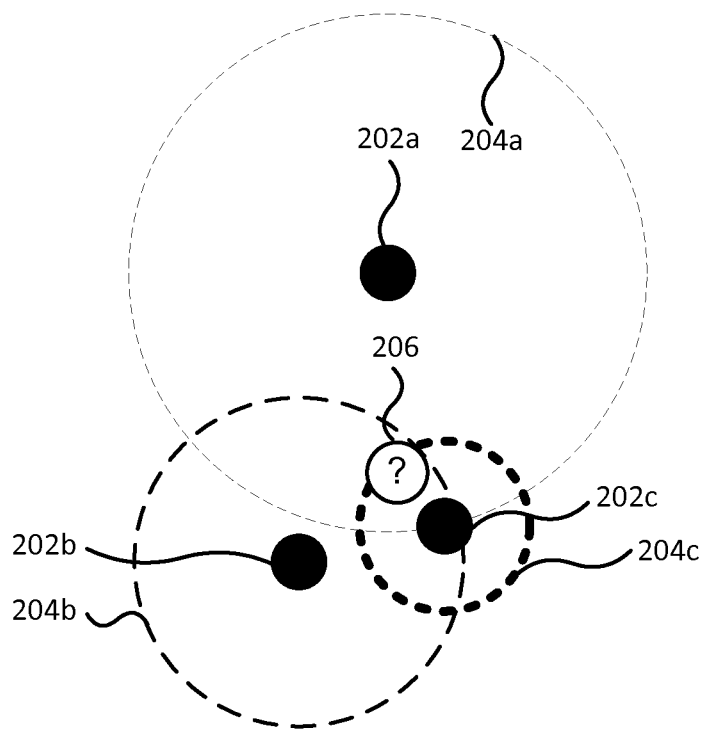
FIG. 2 depicts an illustrative technique of determining a location of a portable electronic device based on a location of adjacent portable electronic devices.

FIG. 2 depicts an illustrative technique of determining a location of a portable electronic device based on a location of adjacent portable electronic devices. As depicted, there are a plurality of portable electronic devices 202a, 202b, 202C for which a location of the device, or an estimate for the location, is available. Each of the portable electronic devices 202a, 202b, 202C include a Bluetooth radio that transmits a Bluetooth signal 204a, 204b, 204c that can be received at the portable electronic device 206 for which the location is being estimated. As will be appreciated, the signal strength of the Bluetooth signals received at the portable electronic device 206 depends upon the distance to the other portable electronic devices 202a, 202b, 202C. The signal strength is represented graphically in FIG. 2 using the width of the broken lines 204a, 204b, 204c, that is the thicker the line, the higher the received signal strength.

When determining the location of the portable electronic device 206, the locations of the other portable electronic devices 202a, 202b, 202C can be determined, for example using the Bluetooth radio identifier of the portable electronic devices, and the locations may be averaged together. Further, the strength of the received signals may be used to provide a weighting of each location. For example, the higher the received signal strength, the closer the portable electronic devices likely are, and as such, the location of the portable electronic device associated with the higher signal strength should receive a higher weighting.

Figure 3:
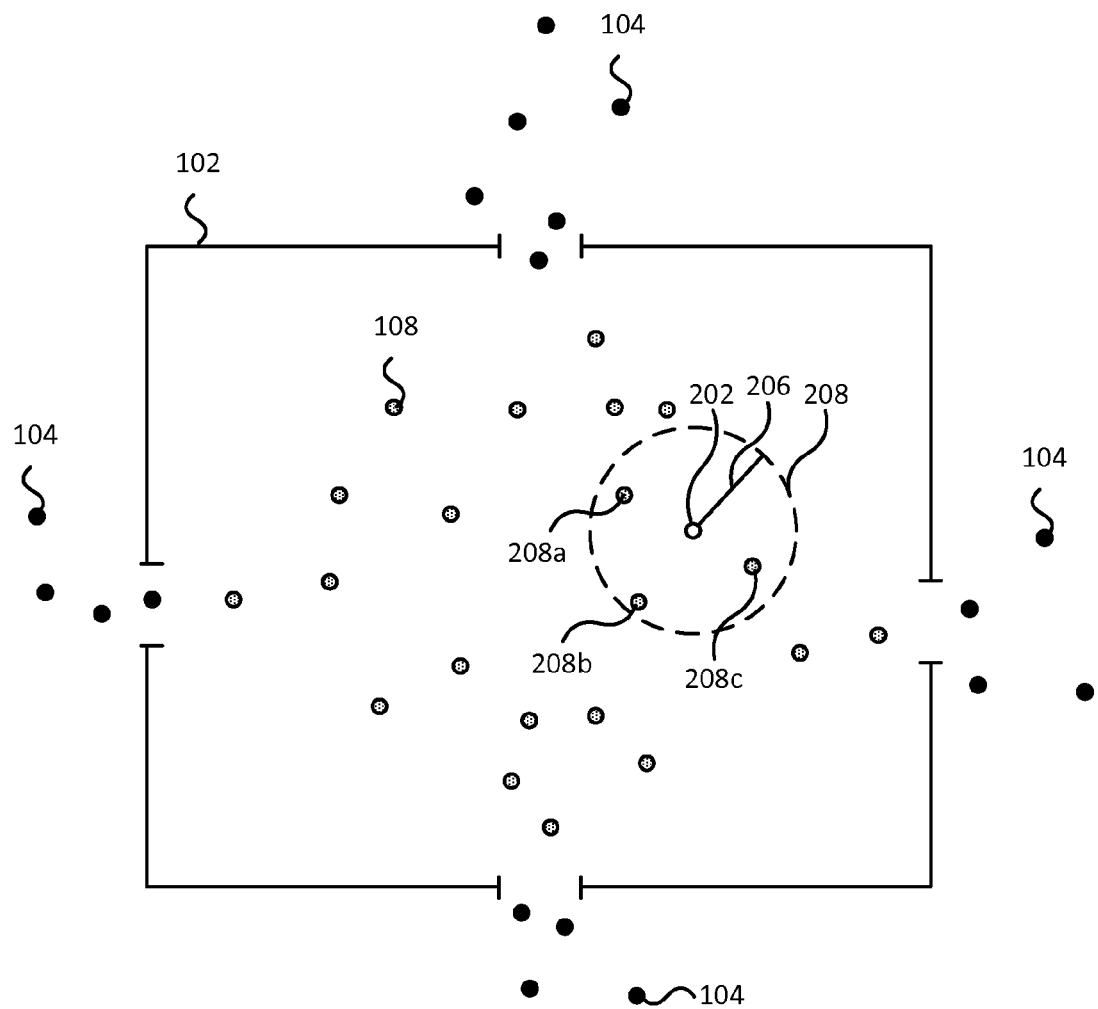
FIG. 3 depicts an illustrative environment in which the cooperative localization can be used.

FIG. 3 depicts an illustrative environment in which the cooperative localization can be used. The environment 300 is substantially similar to the environment 100 described with regards to FIG. 1. However, the portable electronic devices 108 are associated with an estimate of the location of the portable electronic device, represented by the grey circles. As depicted, a plurality of the portable electronic devices 108 inside the indoor space 102 includes an estimate of the portable electronic device's location. A further portable electronic device 202 is inside the indoor space 102 and does not have an associated location, represented by the white circle. The portable electronic device 202 receives a plurality of Bluetooth signals from portable electronic devices 208a, 208b, 208c that are within Bluetooth communication range of the portable electronic device. As will be appreciated, Bluetooth radios typically have a communication range of approximately meters, represented by the broken-line circle 206.

Once the location estimates of the surrounding portable electronic devices 208a, 208b, 208c are determined, the location estimate of the portable electronic device 202 can be determined. As described above with regards to FIG. 2, the location of the portable electronic device 202 can be determined as a weighted average of the locations of portable electronic devices 208a, 208b, 208c. The weighting value can be based on the signal strength of the received Bluetooth signals. Once the location of the portable electronic device is estimated, it can be used to determine location estimates of other portable electronic devices inside the indoor space 102.

The cooperative localization technique described above requires that a location be associated with a plurality of portable electronic devices located within the indoor space 102. As previously described, the portable electronic devices are unable to determine their locations using GPS due to the poor reception of the GPS signal inside the indoor location 102. As such, it is necessary to provide a means for providing location information inside the indoor space 102. As described further below with regards to FIGS. 4 and 5, the portable electronic devices can utilize inertial navigation, based on accelerometers and gyroscopes of the portable electronic device, to determine the device location as the user enters the indoor location.

Figure 4:
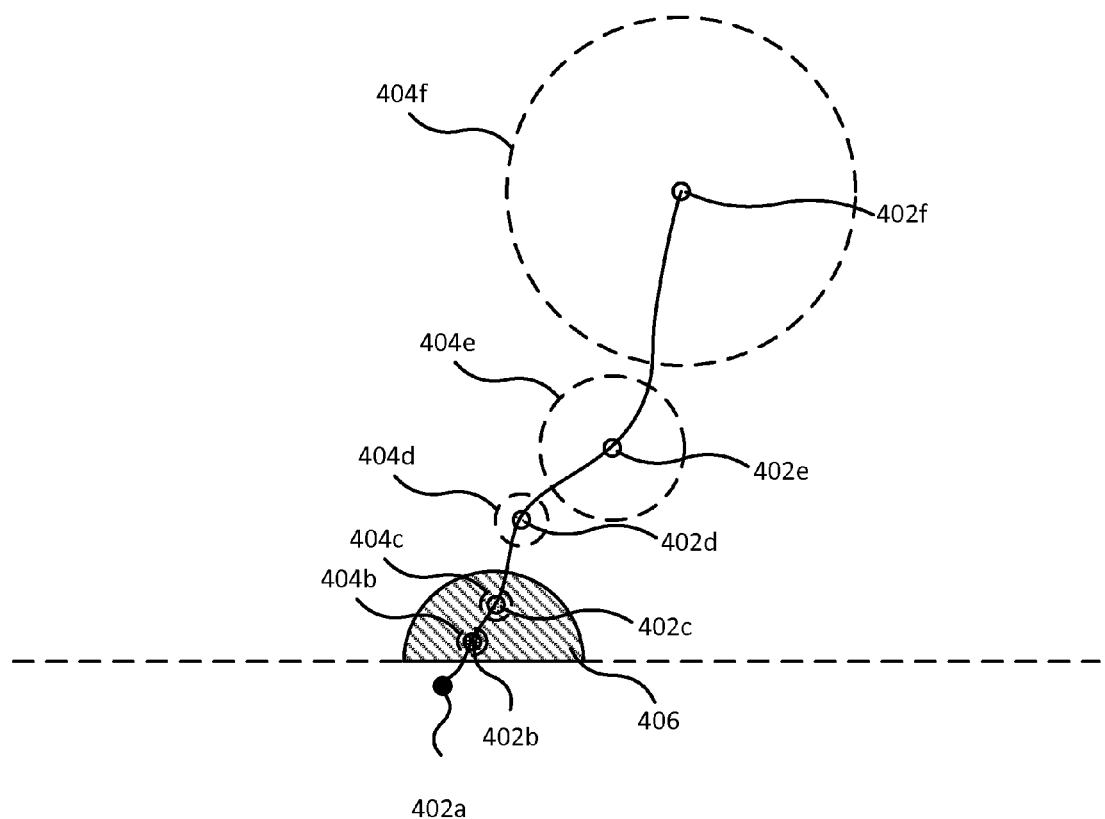
FIG. 4 depicts an illustrative embodiment of extending location information inside of an indoor location.

FIG. 4 depicts an illustrative embodiment of extending location information inside of an indoor location. FIG. 4 depicts a path of a user 402a, 402b, 402c, 402d, 402e, 402f as they enter the indoor space, such as the indoor space 102. As depicted, the location of the user, or more particularly the portable electronic device of the user, may be known to a high degree of accuracy, depicted graphically with the black circle, for example using GPS signals. As the user moves indoors, the portable electronic device loses the GPS reception and begins to use the inertial navigation of the device. As will be appreciated, the inertial navigation of the portable electronic device provides a dead reckoning of the movement of the portable electronic device. However, the error associated with the location estimate increases over time. The accuracy of the location estimate is depicted graphically with the darkness of the circle. The associated error of the location is further represented with the size of the dashed circles 404b, 404c, 404d, 404e, 404f.

As depicted, as the user enters the indoor location, the portable electronic device may use the inertial navigation to extend the location inside of the indoor space. As a result of the portable electronic device using the inertial navigation, the high accuracy of the location information can be extended inside the indoor location represented by the shaded semi-circle 406.

Figure 5:
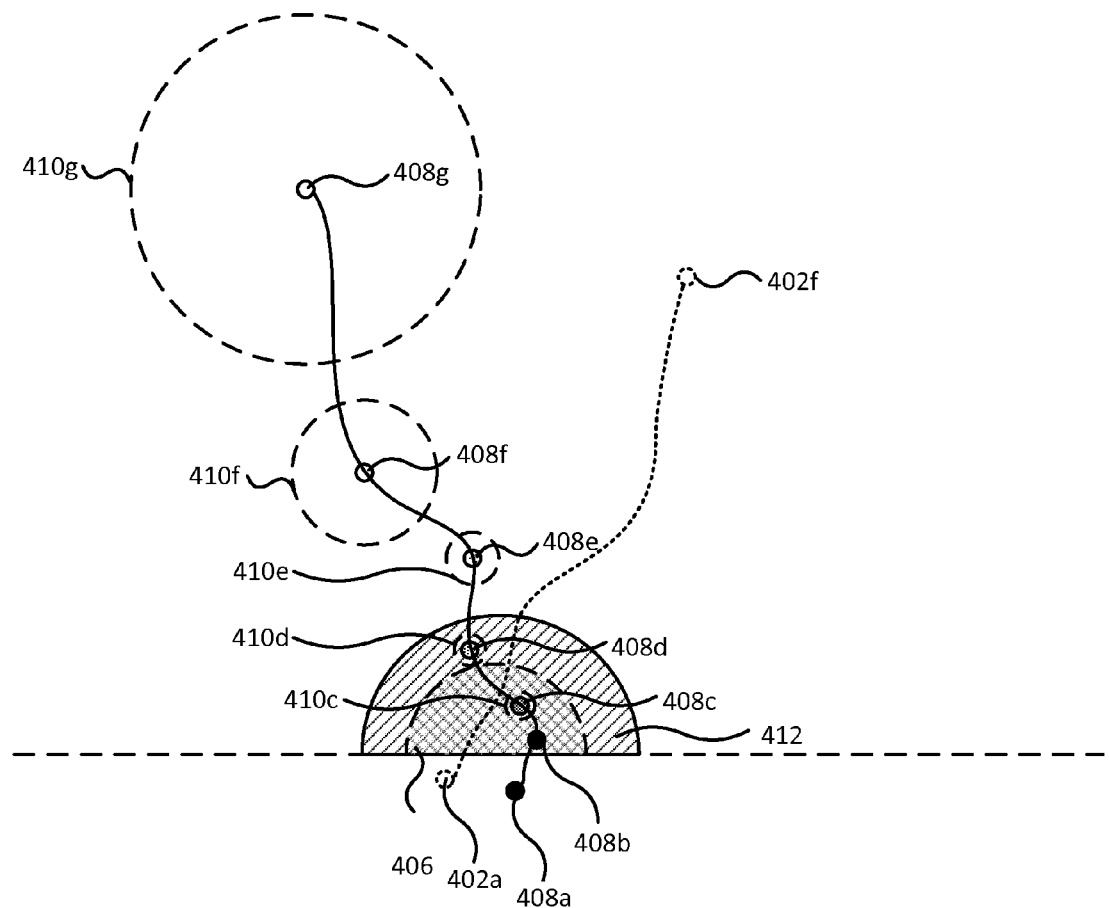
FIG. 5 depicts the embodiment of FIG. 4 when a further user enters the indoor space.

FIG. 5 depicts the embodiment of FIG. 4 when a further user enters the indoor space. As a new user enters the indoor location, the portable electronic device may use the GPS signals, as well as previously determined locations of portable electronic devices, to determine the location of the portable electronic device as it enters the indoor space. As depicted, the user moves from outdoors through the indoor space 408a, 408b, 408c, 408d, 408e, 408f, 408g. Again, the accuracy of the location estimate may decrease as the user moves inside the indoor space. The error associated with the location estimate is represented graphically in FIG. 5 with the size of the broken-line circle 410c, 410d, 410e, 410f, 410g. As the user moves inside, the area associated with accurate location information is extended further inside the indoor space, as represented by the shaded semi-circle 412.

As will be appreciated, the technique for extending the location estimates into the indoor space described above with reference to FIGS. 4 and 5 are intended to be illustrative in nature. In order for the location estimates to be extended indoors, a number of users are required to be entering, exiting, or moving around within the indoor space. As more users are within the indoor space, the accuracy of the location estimates can be improved, and as such, the location information can eventually extend to cover the entire indoor space. As a result, the cooperative localization technique is particularly well suited to public spaces that have a large number of people within at any given time, such as malls, museums, or other buildings. From the above, as more users enter the indoor space, the location estimates will improve. As such, the cooperative localization technique has a convergence time that is dependent upon the arrival and departure rates of users.

Figure 6:
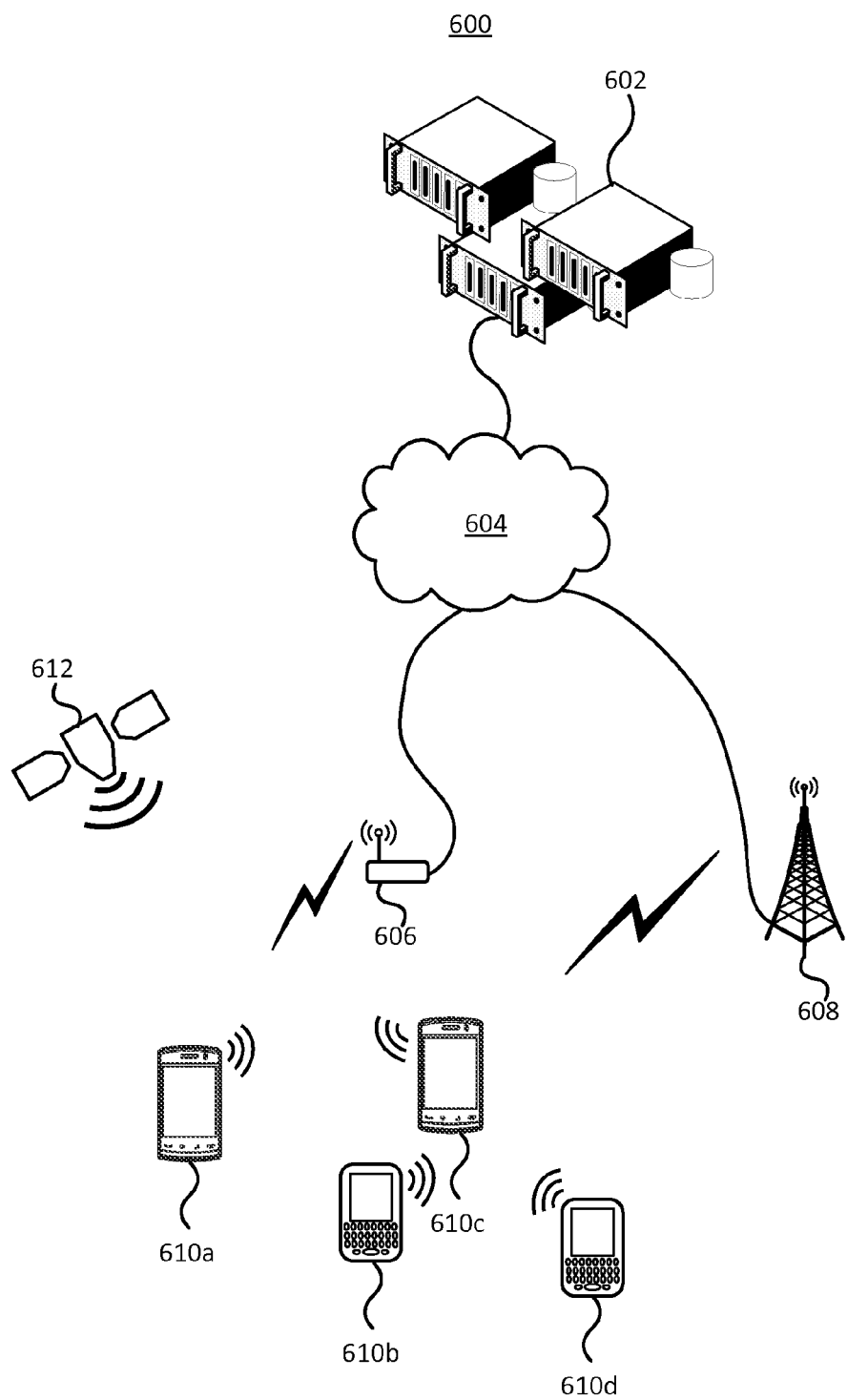
FIG. 6 depicts an environment for determining a cooperative location estimates of portable electronic devices.

FIG. 6 depicts an environment for determining a cooperative location estimate of portable electronic devices. The environment 600 includes one or more localization servers 602 connected to a network 604. The network 604 connects the servers 602 to a communication infrastructure, such as a Wi-Fi communication network 606 and/or a cellular or mobile wide area network communication infrastructure 608. The communication infrastructure is used to communicate wirelessly between the server 602 and one or more wireless devices 610a, 610b, 610c, 610d. The wireless devices 610a, 610b, 610c, 610d may include a GPS receiver for receiving GPS signals from a GPS system 612. The portable electronic devices 610a, 610b, 610c, 610d may further include an inertial navigation system for providing a dead reckoning of the movement of the portable electronic device from a known location.

The server 602 includes cooperative localization functionality for providing an estimate of the portable electronic devices using the Bluetooth radios that are visible from the portable electronic device. Each of the portable electronic devices sends location information to the server 602. Initially, when a device loses GPS reception, for example due to the device moving to an indoor space, the portable electronic device may extend the GPS location into the indoor space using inertial navigation. As the portable electronic device moves within the indoor space, the error associated with the location as determined from the inertial navigation system increases. The portable electronic device may communicate its estimated location, determined using the inertial navigation, to the server 602. The server 602 associates the locations received from portable electronic devices with a Bluetooth radio identifier of the portable electronic device. As a result, the server 602 builds a corpus of location information associated with Bluetooth radio identifiers.

Once the corpus of location information is built up, the location information stored at the server 602 may be used to provide location estimates to other portable electronic devices. A portable electronic device, for example query device 610a, can determine Bluetooth radio identifiers of one or more portable electronic devices, such as portable electronic devices 610b, 610c, 610d, within Bluetooth communication range of the portable electronic device and communicate the Bluetooth radio IDs to the server 602 in a location query message. The server 602 may receive the Bluetooth radio identifiers from the portable electronic device and determine locations associated with the Bluetooth radio identifiers. The server 602 may then determine an estimate of the location for the portable electronic device using the retrieved locations. The query message sent from the portable electronic device may include the Bluetooth radio ID of the portable electronic device and the server may update the corpus of location information to include the determined estimate of the location of the portable electronic device.

The portable electronic devices 610a, 610b, 610c, 610d can periodically send query messages to the server 602. For example, the portable electronic devices 610a, 610b, 610c, 610d can send location query messages every second. As such, the corpus of location information stored at the server 602 maintains current location estimates of the portable electronic devices that can be used to provide estimates of the locations for portable electronic devices.

Figure 7:
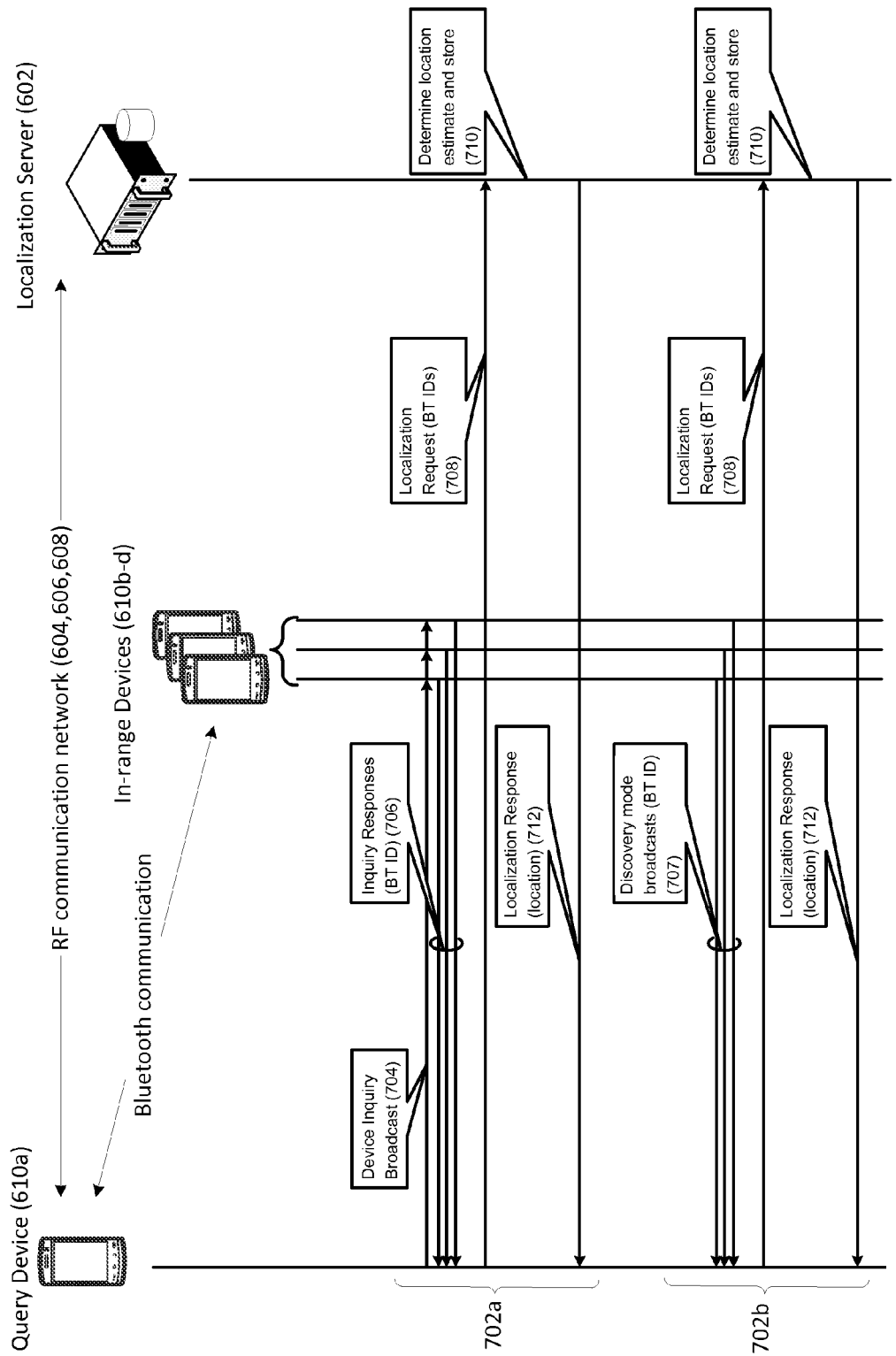
FIG. 7 depicts a process of estimating a location of a portable electronic device.

FIG. 7 depicts a process of estimating a location of a portable electronic device. In FIG. 7, it is assumed that the localization server 602 stores a corpus of location information determined for various portable electronic devices, or more particularly for Bluetooth radio IDs of the portable electronic devices. In FIG. 7, it is further assumed that user device 610a is attempting to determine an estimate for its location. Further the corpus of location information stored at the server 602 includes location information associated with Bluetooth radio IDs of a plurality of portable electronic devices 610b, 610c, 610d that are in Bluetooth communication range with the query device 610a.

As depicted, the query device 610a repeatedly determines (702a, 702b) an estimate for the location. The process begins with the query device 610a broadcasting a Bluetooth Inquiry message (704). The Bluetooth Inquiry message (704) is received by the plurality of in-range portable electronic devices 610b-d that are within Bluetooth communication range of the query device 610a. When the Inquiry message is received at the portable electronic devices 610b-d, they send a response message back to the query device 610a (706). The response message includes the respective Bluetooth radio ID of the portable electronic devices 610b-d. The response messages are received at the query device 610a. The portable electronic device may determine a received signal strength associated with the received response messages. The query device 610a sends a localization request to the server 602 (708). The localization request may include the received Bluetooth IDs as well as the associated received signal strength indication associated with the Bluetooth IDs. The localization request may further include a Bluetooth ID of the query device 610a. The server 602 receives the localization request and determines the location estimate for the query device 610a and then stores the location estimate associated with the Bluetooth radio ID of the query portable electronic device (710). The server 602 sends the location estimate back to the query device 610a in a localization response message (712).

As depicted, the process of determining a location estimate (702a) may be periodically repeated by the portable electronic device (702b), however, in an alternative embodiment, the inquiry message (706) may not be generated by query device 610a, rather transmitter identifiers broadcast from "discoverable" in-range portable electronic devices 610b-d are received in a listening mode at the query device 610a. The broadcast messages may be generated by the in-range portable electronic device 610b-d during operation or configuration in a discoverable mode. The query device 610a will simply "see" in-range portable electronic devices 610b-d, assuming they are discoverable (707), and report the sighting of the transmitter IDs to the server 602 (708). Such discoverable portable electronic devices chirp their ID over the BT radio at frequent intervals (every few seconds) and this chirp can be heard by all nearby devices with their BT receivers turned ON. Thus inter-device communication is not a necessity to determine in-range device for localization.

Figure 8:
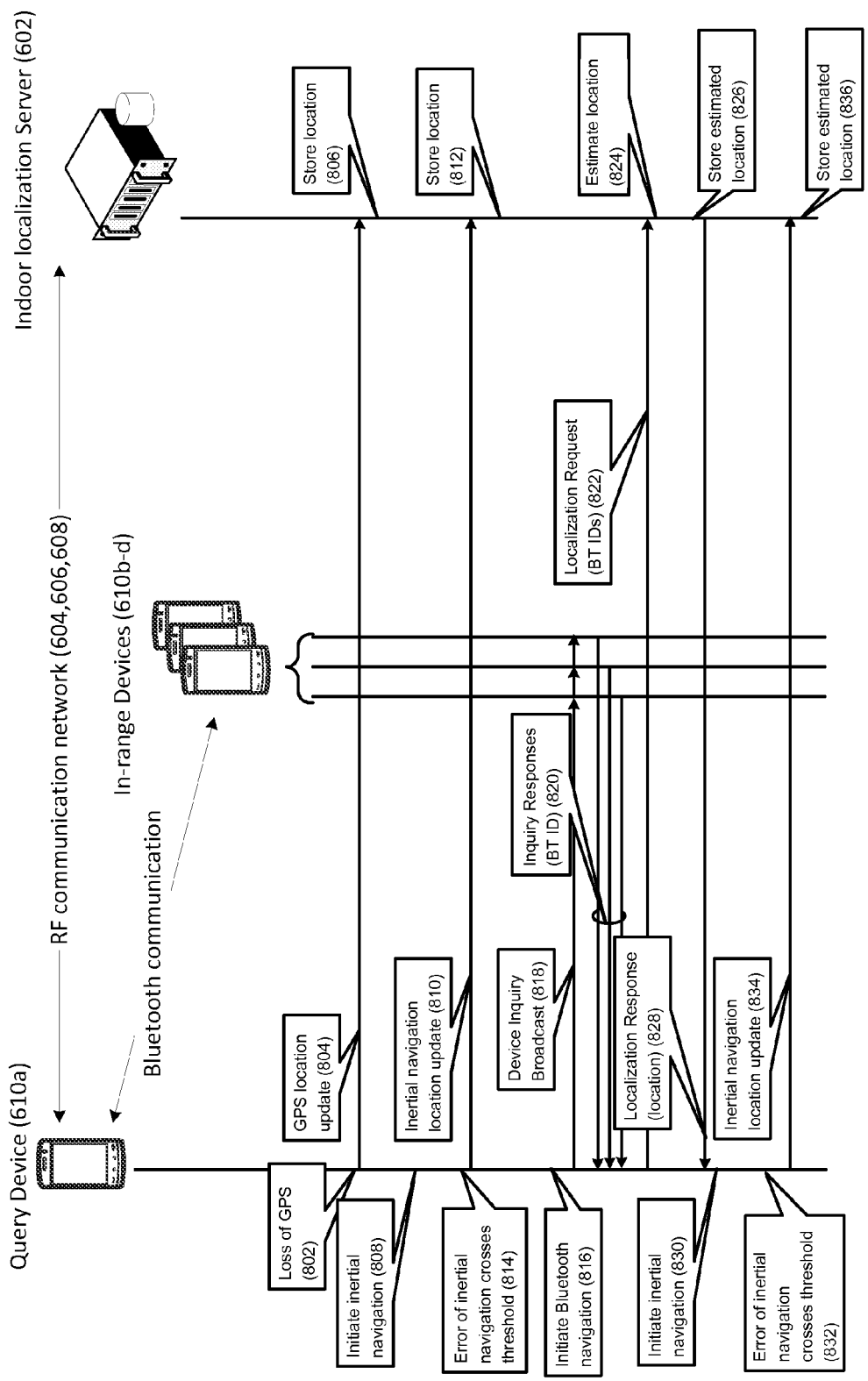
FIG. 8 depicts a process of estimating a location of a portable electronic device.

FIG. 8 depicts a process of estimating a location of a portable electronic device. FIG. 8 is similar to the process of FIG. 7; however, the process of FIG. 8 includes the ability to extend the location information determined using GPS with the use of the internal navigation system of portable electronic devices. As such, the process allows location information to be extended to within the indoor space, allowing location estimates for other portable electronic devices to be determined.

The process described with regards to FIG. 8 begins when the portable electronic device, query device 610a, loses GPS signal reception (802). Upon losing GPS reception, the query device 610a may send the last location information to the server 602 (804), which stores the location with the Bluetooth radio ID (806). Once the query device 610a loses the GPS reception, the query device 610a initiates its inertial navigation system (808). The inertial navigation system of the query device 610a determines the dead reckoning of the portable electronic device. As the location is updated based on the inertial navigation system, the error associated with the determined location increases. At a certain point, the error of the inertial navigation crosses an error threshold (810). Once the location error crosses the error threshold, the query device 610a sends the location determined using the inertial navigation system to the server (812). The server 602a receives and stores the location information associated with the Bluetooth radio ID of the query device 610a (814). Once the error associated with the inertial navigation location crosses the error threshold, the query device 610a initiates the cooperative localization process (816). The cooperative localization process includes the query device 610a. The portable electronic device may broadcast a device Inquiry message (818) which is received with the other portable electronic devices 610b-d in Bluetooth communication range and sends the Bluetooth IDs of the portable electronic devices 610b-d back to the portable electronic devices 610a in Inquiry response messages (820). Alternatively, rather than sending the Inquiry message (818) the query device 610a may passively listen for broadcasts from other discoverable portable electronic devices 610b-d and not be required to communicate directly with the other portable electronic device 610b-d. The query device 610a sends the received Bluetooth radio IDs to the localization server 602 in a localization request message (822). The server 602 receives the localization request message and estimates the location of the query device 610a (824). The server 602 then stores the estimated location associated with the Bluetooth radio ID of the query device 610a (826) and returns the estimated location back to the query device 610a in a localization request message (828). Upon receiving the location estimation, the query device 610a may use the inertial navigation system to extend the location estimate (830) until an error of the inertial navigation location crosses the error threshold (832). Once the inertial navigation location crosses the error threshold, the query device 610a sends the location information to the server 602 (834). The server 602 receives the location information and stores the location (836) associated with the Bluetooth radio ID of the query device 610a.

The process described above with reference to FIG. 8 may be used by a plurality of portable electronic devices 610a-d to extend location information from a high accuracy location, determined for example using GPS, into an area where the high accuracy location information is not available. Advantageously, the cooperative localization process can provide estimates of portable electronic devices in an indoor location, or in locations without GPS reception. The cooperative localization process does not require a large infrastructure to be installed within the indoor location in order to provide the location information, nor does it require any modification to the hardware of the portable electronic devices. As described above, the cooperative localization process uses short-range radio IDs, such as Bluetooth, associated with portable electronic devices that are in close proximity to the query portable electronic device to determine a location estimate. The radio IDs are provided to a server that stores current location estimates associated with radio IDs, which allows the server to estimate a location for the query portable electronic device.

Although the Bluetooth radio devices are described as being provided by portable electronic devices, it is contemplated that the location estimate may be improved in low traffic areas using one or more beacons. The beacons may be provided by one or more fixed Bluetooth radios at known locations. The server may treat the beacon location information in a similar manner to the locations associated with the portable electronic devices; however, as will be appreciated, the location information associated with the portable electronic devices may be periodically culled from the corpus, while the fixed locations of the beacons may be permanently stored in the corpus.

Figure 9:
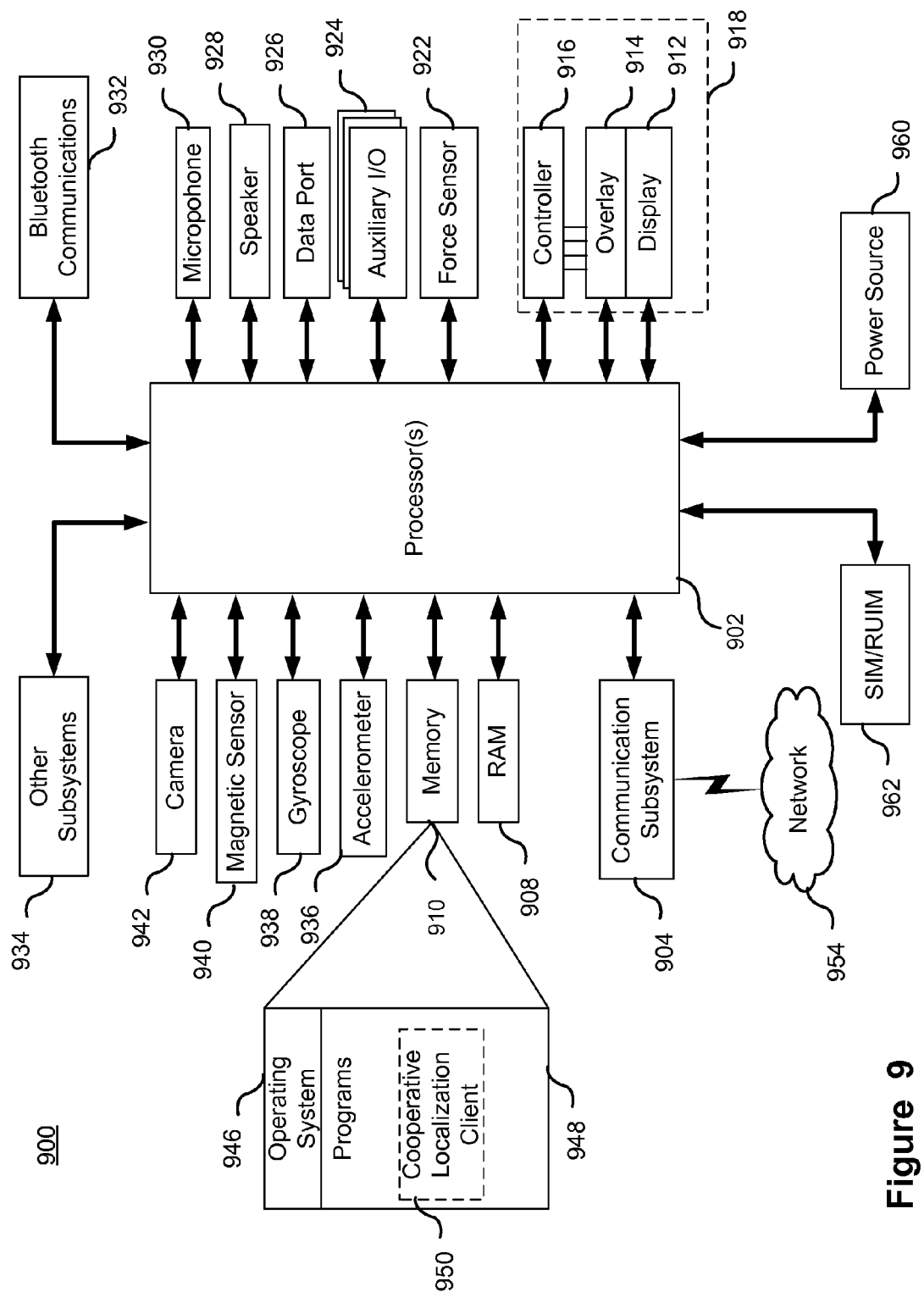
FIG. 9 show a block diagram of an portable electronic device in accordance with an illustrative embodiment.

FIG. 9 show a block diagram of a portable electronic device 900 in accordance with an illustrative embodiment. A processor 902, a multiple core processor or multiple processors may interface with components or modules of the portable electronic device to provide functionality required. A touch-sensitive interface is provided by a touch-sensitive display 918 coupled to the processor 902. The touch-sensitive display 918 may be any suitable touch-sensitive display, such as a capacitive, resistive, infrared, dispersive signal, acoustic pulse recognition, optical imaging, surface acoustic wave (SAW). In the presently described embodiment, the touch-sensitive display 918 is a capacitive touch-sensitive display which includes a capacitive touch-sensitive overlay 914, on a display 912 coupled to a controller 916. The overlay 914 may be an assembly of multiple layers in a stack which may include, for example, a substrate, a ground shield layer, a barrier layer, one or more capacitive touch sensor layers separated by a substrate or other barrier, and a cover.

The processor 902 and other components of the device are powered by a power source 960 and interfaces with memory 910 providing an operating system 946 and programs or applications 948 providing instructions for execution by the processor 902. Random access memory 908 is provided for the storage of the instructions and for processing data to be sent to or received from various components of the portable electronic device. The instructions when executed by the processor 902 may configure the portable electronic device to provide varying functionality for displaying data. The functionality may include functionality 950 for providing a cooperative localization client on the portable electronic device as described above. Although the functionality 95o is depicted as being separate from the operating system 946, it is contemplated that the functionality could be provided as component of the operating system.

Various input/out devices or sensors may be provided such as an accelerometer 936, light and/or gyroscope sensors 938, magnetic sensor 940 such as a Hall Effect sensor, and one or more cameras 942, a force sensor 922 as well as one or more auxiliary I/O devices 924. A communication subsystem 904 is provided for enabling data to be sent or received with a local area network 954 or wide area network utilizing different physical layer and access technology implementations. The communication subsystem may be utilized to request and pre-cache data based upon possible gesture event outcomes.

The device may include connections to other subsystems 934, including a subscriber identity module or removable user identity module 962 may be provided depending on the requirement of the particular network access technology to provide user access or identify information. Short-range communications, such as a Bluetooth radio, 932 may also be provided and may further include near-field communication (NFC), radio frequency identifier (RFID), ZigBee, IEEE 802.15 or other short-range communication technologies. The portable electronic device may also be provided with a data port 926 and auxiliary input/output interface for sending and receiving data. A microphone 930 and speaker 928 may also be provided to enable audio communications via the portable electronic device 900.

Figure 10:
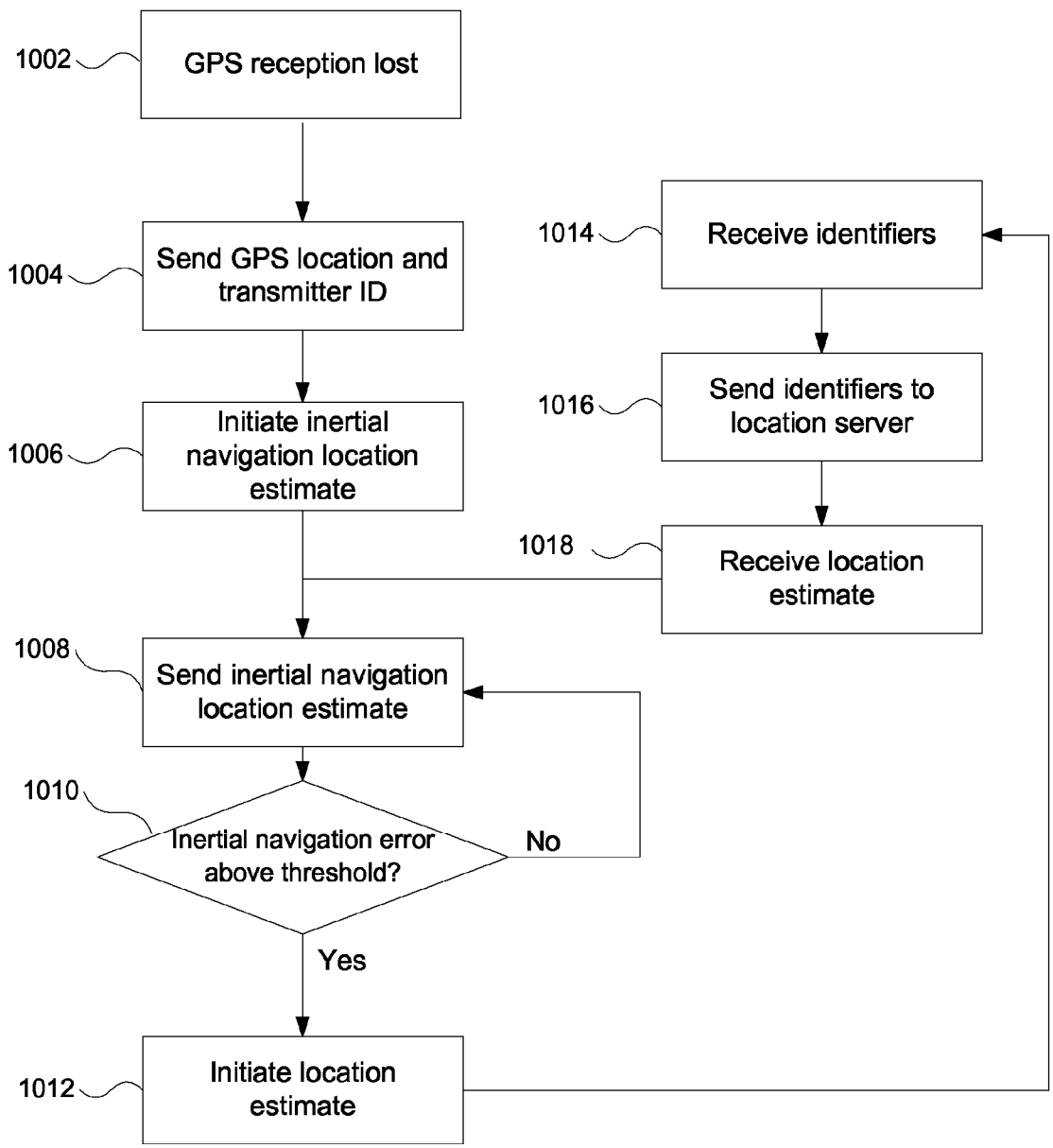
FIG. 10 depicts a method of estimating a location at a portable electronic device using received short-range signals.

FIG. 10 depicts a method of cooperative localization of a portable electronic device. The method woo begins when GPS reception is lost at the portable electronic device (1002). Once the GPS reception is lost, the portable electronic device sends its last location information to a localization server that stores location information associated with radio IDs (1004). The portable electronic device initiates an inertial navigation system (1006) that determines a dead reckoning of the position of the portable electronic device based on the last GPS location and sensors, such as accelerometers and gyroscopes of the portable electronic device. The portable electronic device periodically sends the inertial navigation location estimate to the cooperative localization server (1008) and then determines if the error associated with the inertial navigation location estimate is above a location error estimate (1010). If the error is not above a location error threshold (No at 1010) the portable electronic device may send an updated inertial navigation location estimate to the cooperative localization server after a short delay. If the error is above a location error threshold (Yes at 1010) the portable electronic device initiates Bluetooth location estimation functionality (1012). The portable electronic device receives device transmitter identifiers from portable electronic devices in communication range (1014). The broadcast information may be provided as part of a discoverable mode in which the portable electronic devices 610b-d broadcast discoverable messages containing their device identifier such as in a Bluetooth discoverable mode. Alternatively the query device 610a may send an inquiry message which is broadcast to nearby devices 610b-d which devices in turn respond with a message including the transmitter or radio ID of the responding portable electronic devices. Once the portable electronic device has received the identification messages, the query portable electronic device sends the Bluetooth identifiers to the cooperative localization server (1016). The cooperative localization server determines an estimate for the location of the query portable electronic device and sends the location estimate back to the query portable electronic device. The portable electronic device receives the location estimate (1018) which can then be used to provide location services. Once the location estimation is received (1018), the method may use the inertial navigation system to provide a dead reckoning of the location of the portable electronic device from the received estimate and sends the inertial navigation location estimate to the cooperative localization server (1008).

Figure 11:
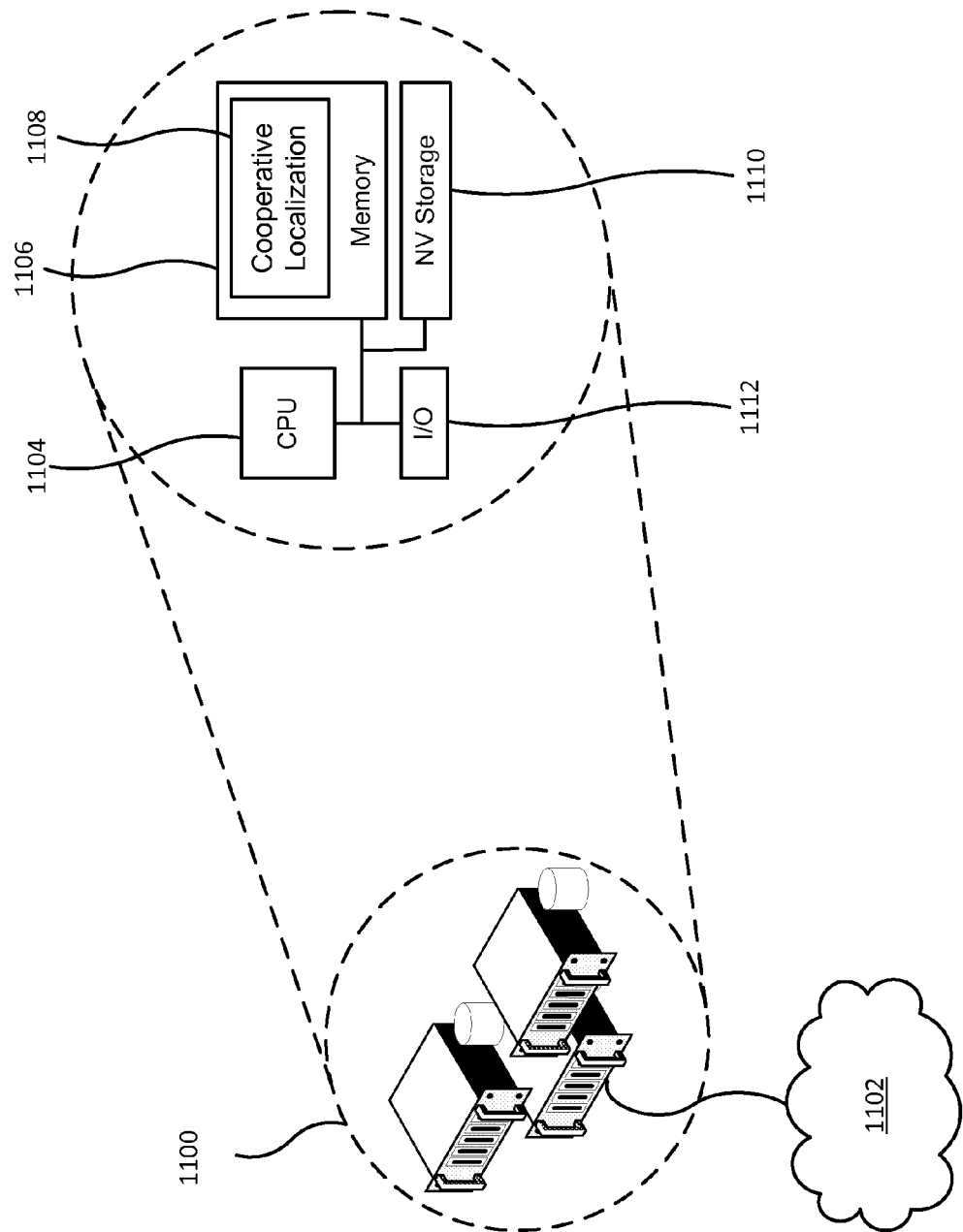
FIG. 11 depicts components of a cooperative localization server.

FIG. 11 depicts components of a cooperative localization server. The cooperative localization server 1100 may be used as the cooperative localization server 602 described above. The localization server 1100 may comprise one or more physical servers that are coupled to a communication network 1102. The localization server 1100 may be provided by a plurality of physical servers, although conceptually, the server 1100 is comprised of a central processing unit (CPU) 1104 that is coupled to a memory 1106 storing instructions 1108 providing cooperative localization functionality 1108. The server 1100 may further comprise non-volatile storage 1110 and one or more input/output (I/O) components 1112.

Figure 12:
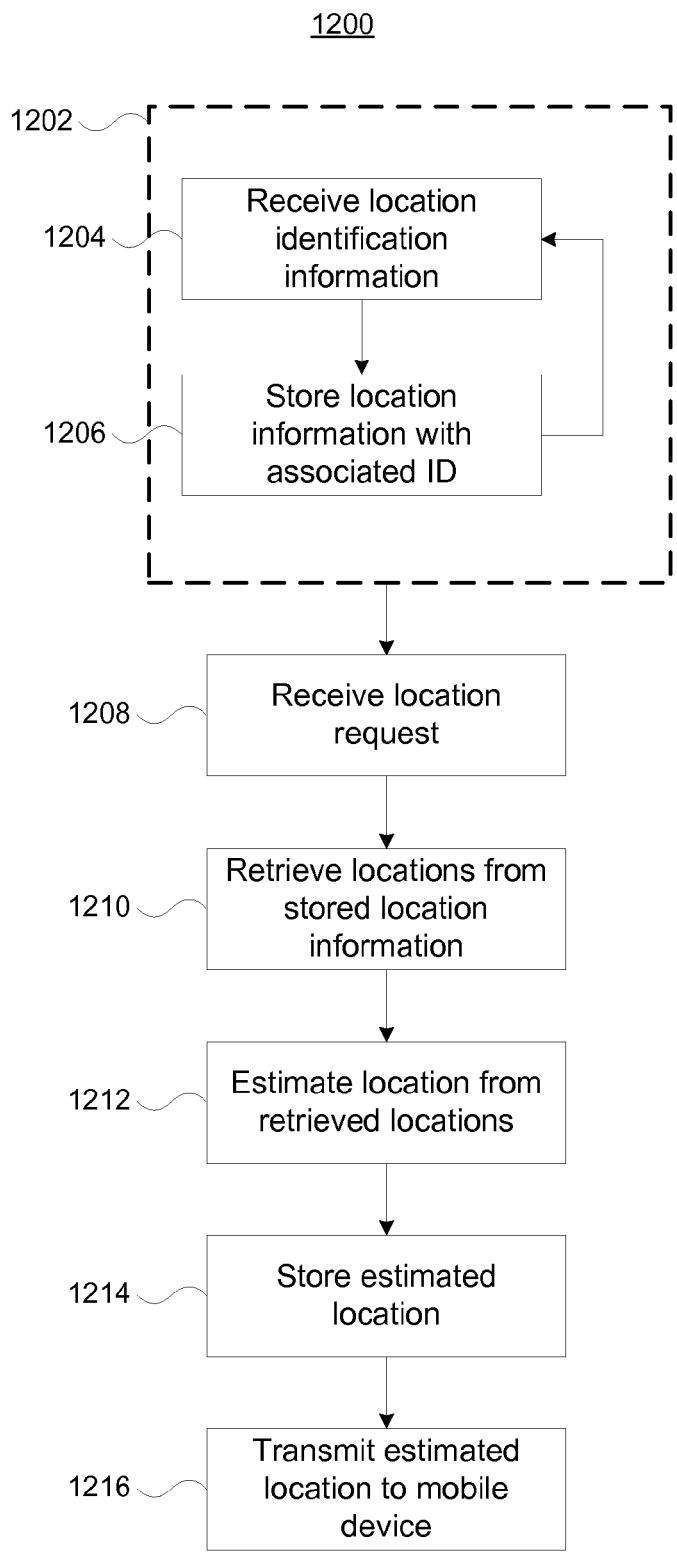
FIG. 12 depicts a method of cooperative localization at a cooperative localization server.

FIG. 12 depicts a method of estimating a location of a portable electronic device using radio IDs. The method 1200 may be implemented in a server by the execution of instructions stored in memory. The method 1200 populates a corpus of location information associated with radio identifiers (1202). The population of the location corpus comprises receiving location information from a portable electronic device (1204). The location information may be determined by portable electronic devices in various ways, including, for example, using a GPS receiver, or using an inertial navigation system. The received location information includes a Bluetooth radio identifier of the portable electronic device associated with the location information. The server stores the location information, associating the location with the Bluetooth radio ID (1206).

In addition to receiving messages populating the corpus of location information, the server may receive a location request message from a portable electronic device (1208) that includes Bluetooth radio IDs of nearby devices. The locations associated with the received Bluetooth radio IDs are retrieved from the stored information in the corpus (1210) and used to provide an estimate of the location of the portable electronic device (1212). The location request message may include an indication of received signal strengths associated with each of the Bluetooth radio IDs, which can be used to provide a weighting of respective locations in estimating a location. Once the location is estimated and stored in the corpus (1214), it is transmitted to the portable electronic device (1216). When storing the estimated location in the corpus, the server may replace any location information associated with the Bluetooth radio ID of the query portable electronic device.

As described, above, the cooperative localization process can be used to provide location estimates of portable electronic devices in an indoor space. The cooperative localization process may utilize previously estimated locations associated with different portable electronic devices in estimating the location of the portable electronic device. As such, the cooperative localization server maintains a corpus of current location estimates of portable electronic devices associated with Bluetooth radio IDs. The cooperative localization process can be used in indoor spaces without requiring the installation and maintenance of a large number of location beacons. Although not required, it is contemplated that the cooperative localization technique may utilize fixed, or moving, beacons that can provide their location to a high degree of accuracy.

In some embodiments, any suitable computer readable media can be used for storing instructions for performing the methods described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of cooperative localization of a portable electronic device, the method comprising: receiving at a server a plurality of location identification messages comprising inertial navigation locations determined from previously known GPS locations each providing a known location information of a respective portable electronic device and an associated Bluetooth or IEEE 802.15 transmitter identification (ID) of the respective portable electronic device; storing the received location information and associated Bluetooth or IEEE 802.15 transmitter IDs at the server; receiving at the server a location request message providing one or more Bluetooth or IEEE 802.15 transmitter IDs of portable electronic devices in communication range with a query portable electronic device and a Bluetooth or IEEE 802.15 transmitter ID of the query portable electronic device; retrieving location information from the stored location information associated with the one or more Bluetooth or IEEE 802.15 transmitter IDs received in the location request message; estimating a location of the query portable electronic device based on the retrieved location information; storing, at the server, the estimated location of the query portable electronic device with the associated Bluetooth or IEEE 802.15 transmitter ID; transmitting the estimated location to the query portable electronic device; and upon receiving the location estimation, the query portable electronic device uses an inertial navigation system to extend the location estimate until an error threshold is reached.

2. The method of claim 1 wherein the transmitter ID is associated with a short-range communication interface of the portable electronic device.

3. The method of claim 2 wherein the short-range communication interface is a Bluetooth interface.

4. The method of claim 2 wherein the short-range communication interface is an IEEE 802.15 personal area network interface.

5. The method of claim 1 wherein the indication of the one or more transmitters IDs is received from the portable electronic device using a mobile wide area network infrastructure.

6. The method of claim 1 wherein estimating the location of the portable electronic device comprises estimating the location as an average of the retrieved respective locations of the one or more transmitter IDs.

7. The method of claim 1 wherein the location information received in the plurality of location identification messages is determined at the one or more portable electronic devices using one or more of:
received GPS signals; or
sensor information providing an inertial navigation location from previously known location.

8. The method of claim 1 further comprising determining the one or more transmitter IDs detected at the portable electronic device by:
broadcasting an inquiry message; and
receiving respective inquiry response messages including a transmitter ID from radios visible from the portable electronic device.

9. The method of claim 1 further comprising determining the one or more transmitter IDs detected from the query portable electronic device by receiving transmitter ID transmitted from in-range portable electronic devices at periodic intervals.

10. The method of claim 1 wherein one or more of the transmitter IDs detected from the portable electronic device comprise a stationary transmitter having a known location.

11. The method of claim 1 further comprising using the estimated location within the indoor public space to provide additional information to the query portable electronic device.

12. The method of claim 11 wherein the additional information comprises one or more of:
directions to a point of interest relative to the estimated location;
information associated with the estimated location; or
mapping data associated with the estimated location.

13. A computing device for estimating a location of a portable electronic device, the computing device comprising: a processor for executing instructions; and a memory for storing instructions, the instructions when executed by the processor configuring the computing device to perform: receiving at a server a plurality of location identification messages comprising inertial navigation locations determined from previously known GPS locations each providing a known location information of a respective portable electronic device and an associated Bluetooth or IEEE 802.15 transmitter identification (ID) of the respective portable electronic device; storing the received location information and associated Bluetooth or IEEE 802.15 transmitter IDs at the server; receiving at the server a location request message providing one or more transmitter IDs of portable electronic devices in communication range with a query portable electronic device and a Bluetooth or IEEE 802.15 transmitter ID of the query portable electronic device; retrieving location information from the stored location information associated with the one or more Bluetooth or IEEE 802.15 transmitter IDs received in the location request message; estimating a location of the query portable electronic device based on the retrieved location information; storing, at the server, the estimated location of the query portable electronic device with the associated Bluetooth or IEEE 802.15 transmitter ID; transmitting the estimated location to the query portable electronic device; and upon receiving the location estimation, the query portable electronic device uses an inertial navigation system to extend the location estimate until an error threshold is reached.

14. The computing device of claim 13 wherein the transmitter ID is associated with a short-range communication interface of the portable electronic device.

15. The computing device of claim 14 wherein the location identification messages are received through a wireless communication network infrastructure coupled to the server.

16. The computing device of claim 15 wherein the short-range communication interface is a Bluetooth interface.

17. The computing device of claim 13 wherein estimating the location of the portable electronic device comprises estimating the location as an average of the retrieved respective locations of the one or more transmitter IDs.

18. The computing device of claim 13 wherein the location information received in the plurality of location identification messages is determined at the one or more portable electronic devices using one or more of:
    received GPS signals; and
    sensor information providing an inertial navigation location from previously known location.

19. The computing device of claim 13 further comprising determining the one or more transmitter IDs detected from the portable electronic device comprising:
    broadcasting an inquiry message; and
    receiving respective inquiry response messages including a transmitter ID from radios detected from the portable electronic device.

20. The computing device of claim 13, further comprising determining the one or more transmitter IDs detected the query portable electronic device by receiving transmitter ID transmitted from in-range portable electronic devices at periodic intervals.

21. The computing device of claim 13 wherein one or more of the transmitter IDs detected from the portable electronic device comprise a stationary transmitter ID having a known location.

22. The computing device of claim 13 wherein the indication of the one or more transmitters IDs is received from the portable electronic device using a mobile wide area network infrastructure.

23. The computing device of claim 13 further comprising using the estimated location within the indoor public space to provide additional information to a query portable electronic device.

24. The computing device of claim 23 wherein the additional information comprises one or more of:
    directions to a point of interest relative to the estimated location;
    information associated with the estimated location; and
    mapping data associated with the estimated location.

25. A non-transitory computer readable memory containing instructions for cooperative localization of a portable electronic device, the instructions which when executed by a processor performing: receiving at a server a plurality of location identification messages comprising inertial navigation locations determined from previously known GPS locations each providing a known location information of a respective portable electronic device and an associated Bluetooth or IEEE 802.15 transmitter identification (ID) of the respective portable electronic device; storing the received location information and associated Bluetooth or IEEE 802.15 transmitter IDs at the server; receiving at the server a location request message providing one or more Bluetooth or IEEE 802.15 transmitter IDs of portable electronic devices in communication range with a query portable electronic device and a Bluetooth or IEEE 802.15 transmitter ID of the query portable electronic device; retrieving location information from the stored location information associated with the one or more Bluetooth or IEEE 802.15 transmitter IDs received in the location request message; estimating a location of the query portable electronic device based on the retrieved location information; storing, at the server, the estimated location of the query portable electronic device with the associated transmitted ID; transmitting the estimated location to the query portal electronic device; and upon receiving the location estimation, the query portable electronic device uses an inertial navigation system to extend the location estimate until an error threshold is reached.

* * * * *